United States Patent [19]
Yotsugi

[11] 3,900,698
[45] Aug. 19, 1975

[54] ELECTRIC WIRE INSULATING COVER

[76] Inventor: Sanji Yotsugi, No. 3-19, Umeno-cho, Takarazuka-shi, Japan

[22] Filed: May 2, 1974

[21] Appl. No.: 466,129

[52] U.S. Cl. .............................. 174/5 R; 174/136
[51] Int. Cl. ...................... H02g 1/02; H01b 17/00
[58] Field of Search ...... 174/5 R, 40 R, 136, 138 R, 174/138 F, 156, 167, 211; 191/35

[56] References Cited
UNITED STATES PATENTS

| | | | |
|---|---|---|---|
| 1,598,155 | 8/1926 | Salisbury | 174/5 R |
| 1,867,430 | 7/1932 | Wisner | 174/5 R X |
| 2,871,282 | 1/1959 | Tipsord et al. | 174/5 R |
| 3,133,984 | 5/1964 | Farough et al. | 174/5 R |
| 3,835,238 | 9/1974 | West | 174/5 R |

*Primary Examiner*—Laramie E. Askin
*Attorney, Agent, or Firm*—George B. Oujevolk

[57] ABSTRACT

An electric wire insulating apparatus in the form of a longitudinally split cylinder made of synthetic resin or the like having properties of insulation and formation-flexibility under the effect of heat, the apparatus comprising a cylindrical body and two projections projecting longitudinally therefrom so as to face each other with a minute space in between. Said cylindrical insulator is joined at one terminal portion thereof by a longitudinally split cylindrical coupling which is made of the same material and is bigger diametrically than the cylindrical insulator proper, said coupling being provided therein with a concave groove in which to fit the cylindrical insulator at one of the terminal portions thereof which is diametrically enlarged so as to firmly fit in said concave groove.

1 Claim, 5 Drawing Figures

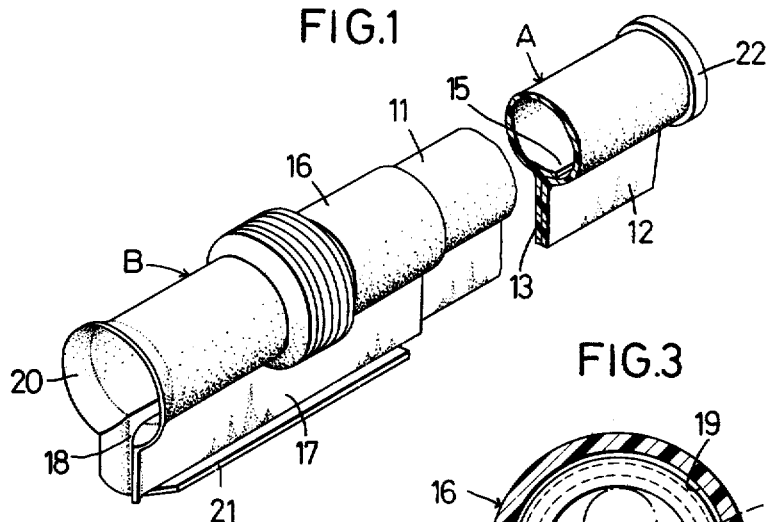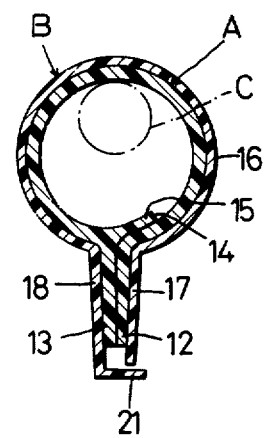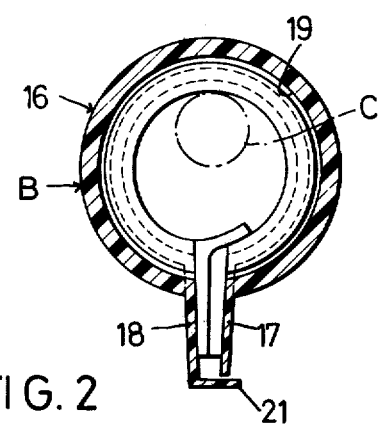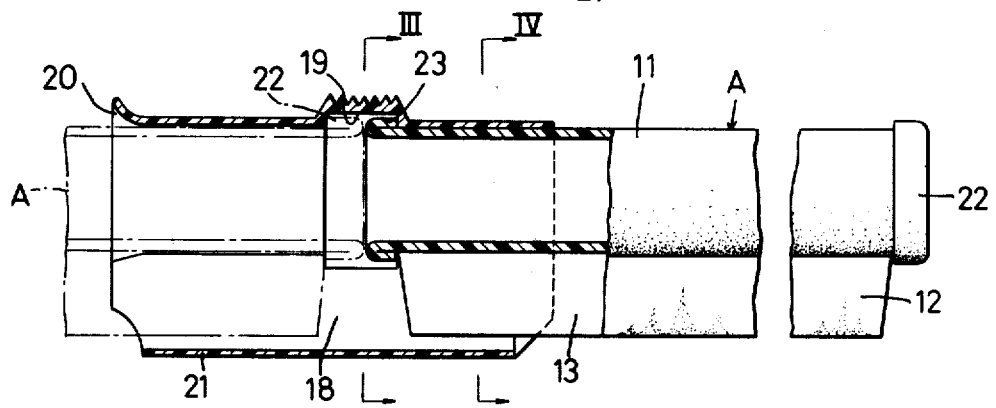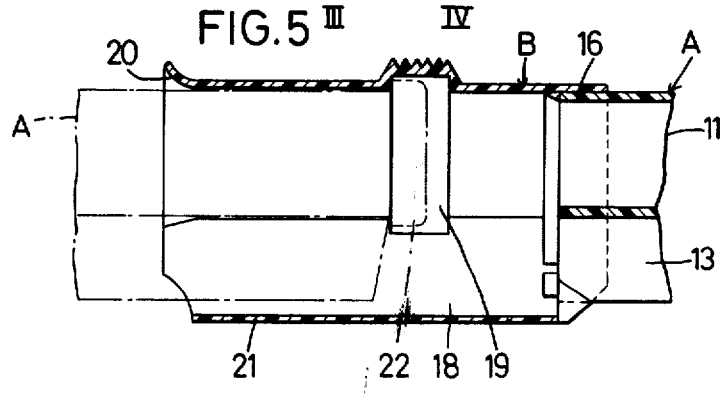

ELECTRIC WIRE INSULATING COVER

The present invention relates to an electric wire insulating apparatus in the form of a cylinder made of synthetic resin or the like, and more particularly to electric wire insulating cylindrical apparatus comprising a longitudinally split cylindrical body and a longitudinally split coupling connected thereto by adhesion, welding or the like, both the cylindrical body and the cylindrical coupling having two longitudinal projections each, said projections projecting from the cylindrical body and the coupling at the split edges thereof, respectively.

It is generally known that electric wires stretched in the vicinity of structures, trees and the like are covered with cylindrical insulators to prevent short-circuits as a result of touching structures, trees and the like, since the short-circuits can cause disastrous accidents such as fires, an electric shock to people and animals, etc. Conventional insulators of this kind, however, have to be turned out as long pieces and are an inconvenience with regard to storage, carrying, and placing over electric wires.

An object of the present invention is to provide an electric wire insulating cylindrical apparatus provided with a coupling, said coupling playing the role of joining another similar apparatus therewith thereby making it possible to lengthen the cylindrical insulator to correspond with the length of a wire to be covered.

Another object of the present invention is to provide a cylindrical insulator capable of preventing infiltration by rainwater both in the apparatus proper and the coupling.

A third object of the present invention is to provide a cylindrical insulator having a predetermined length which is convenient for producing, storing and carrying.

A fourth object of the present invention is to provide a cylindrical insulator capable of securely fitting one of said insulators to the other by means of inserting one unit into a coupling of the other one.

These objects can be accomplished by the improvement, combination and operation of every part constituting the present invention, the preferred embodiment of which will be described in detail in relation with the annexed drawing wherein FIG. 1 is a perspective view of an electric wire insulating cylindrical apparatus provided with a coupling according to the present invention.

FIG. 2 is a partially-cutaway, partially sectional longitudinal view showing the joining state of the coupling with the cylindrical apparatus in a first embodiment.

FIG. 3 is a section of arrow-marked III—III in FIG. 2.

FIG. 4 is a section of arrow-marked IV—IV in FIG. 2.

FIG. 5 is a partial longitudinal section of the present invention showing the joining state of the coupling with the cylindrical insulator in a second embodiment.

In the first embodiment shown in FIGS. 1 to 4, the letter A designates an electric wire insulating apparatus comprising a longitudinally split cylindrical body 11 and two longitudinal projections 12 and 13, said two projections 12 and 13 projecting outward from the cylindrical body 11 at the outer periphery thereof so as to face each other with a small distance in between. Electric wire insulator A has a predetermined length and is made of synthetic resin such as polyethylene which has good insulating capacity, is flexible and formed by heat.

The cylindrical body 11 is longitudinally split at a break 14, from the base portion of which projects one of said projections designated by numeral 12 in this case.

In the manufacturing process of making the electric wire insulator A, or more precisely the cylindrical body 11, heat applied pressing is provided so as to obtain elasticity and accordingly an inward grip which enables the apparatus to firmly hold the wire under its covering and also enables the two projections 12 and 13 to abut firmly on each other. The wall of cylindrical body 11 overlaps at one split terminal portion 15 thereof over the inside surface of the same wall of the cylindrical body 11 at the other terminal portion. From terminal portion 15 at a little distance from the edge, one of the projections, designated by numeral 13 in this case, projects outward. Cylindrical insulator apparatus A has a flange edge 22 at one end thereof.

The letter B designates a coupling joining the electric wire insulating cylindrical apparatus A at one end thereof. Coupling B also comprises a cylindrical body 16 and two longitudinal projections 17 and 18 projecting outward therefrom. Coupling B is larger in diameter than insulator A so as to admit therein the insertion of cylindrical insulator A.

Cylindrical body 16 is provided therein with a cylindrically formed concave groove 19. Cylindrical body 16 at one side is diametrically expanded to fit over insulator A, i.e., cylindrical body 16 is expanded diametrically at the open side 20 so that it is easier to insert another cylindrical insulator A therein (see FIG. 3).

Projection 18 bends at the tip thereof toward the other projection 17 thereby forming a longitudinal piece 21 at right angles to the projection 18 for covering a clearance between projections 17 and 18 at the tip thereof.

As previously stated, cylindrical insulator A at the outer periphery of one open end thereof has a diametrically expanded flange edge 22, said edge 22 being designed to fit in aforementioned concave groove 19 inside the coupling B.

In the first embodiment shown in FIG. 2, the cylindrical body 11 of the insulating apparatus A joins the attached coupling B in the way that the cylindrical body 11 with edge 23 fits in the concave groove 19 of the coupling B, said concave groove 19 having a space for admitting the insertion of the apparatus A, i.e., the other cylindrical body 11, at an opposite edge 22 thereof. The affixing of cylindrical body 11 to the attached coupling B is made by means of adhesion, welding, etc., whereas connection of the other cylindrical insulator A to the coupling B from the opposite side is secured only by means of insertion with the expanded edge 22 abutting on the coupling B at the concave groove 19.

In the second embodiment shown in FIG. 5, cylindrical body 11 has no diametrical expansion at the edge to join the attached coupling B, and accordingly, the concave groove 19 of the coupling B needs space only for admitting the other cylindrical body 11 at the edge 22.

This cylindrical insulator A is disposed over the electric wire C by means of opening wide the projections 12 and 13 thereby connecting the cylindrical insulator A over the electric wire C with the projections 12 and 13 directed vertically downward. The inward grip of cylindrical insulator A helps the insulator A settle down firmly over the electric wire C, and the same holds true with the coupling B. Several units of cylindrical apparatus A are connected one by one with each other as hereinbefore described until they form a length needed for covering an electric wire.

What is claimed is:

1. An electric wire insulating arrangement comprising in combination:
   a. an elongated flexible split cylindrical body (11) with two lateral projections (12, 13) disposed to face each other in parallel with a small clearance therebetween, one of said projections (12) comprising an extension of a first outer wall as well as an inner cylindrical wall portion, the other projection (13) extending outward from a second outer cylindrical wall portion of which the inner portion continues spirally inwards to overlap the first wall portion, an outer flange edge (22) at least at one end of said cylindrical body; and,
   b. a longitudinally flexible split cylindrical coupling (16) of a diameter slightly larger than the outer diameter of said body (11) with two lateral coupling projections (17, 18) forming extensions of the cylindrical wall and with a frustro-conical opening at one end, said coupling projections being so spaced and said opening so sized that said body (11) can pass therethrough, a groove (19) in said coupling receiving said flange edge (22) and holding it firmly therein, and a longitudinal protective piece (21) attached to one of said coupling projections (18) and extending over to the other projection (17) disposed to cover the clearance therebetween, said body (11) and coupling (16) when nested one in the other forming a protecting covering for a wire.

* * * * *